US010626312B2

(12) United States Patent
Murakami et al.

(10) Patent No.: US 10,626,312 B2
(45) Date of Patent: *Apr. 21, 2020

(54) THERMAL INTERFACE MATERIALS MADE FROM GRAPHITE SHEETS UNDER HIGH VACUUM CONDITION

(71) Applicant: Kaneka Corporation, Osaka (JP)

(72) Inventors: Mutsuaki Murakami, Osaka (JP);
Masamitsu Tachibana, Osaka (JP);
Atsushi Tatami, Osaka (JP)

(73) Assignee: KANEKA CORPORATION, Osaka (JP)

( * ) Notice: Subject to any disclaimer, the term of this patent is extended or adjusted under 35 U.S.C. 154(b) by 349 days.

This patent is subject to a terminal disclaimer.

(21) Appl. No.: 15/610,929

(22) Filed: Jun. 1, 2017

(65) Prior Publication Data

US 2017/0267908 A1 Sep. 21, 2017

Related U.S. Application Data

(63) Continuation of application No. PCT/JP2015/084041, filed on Dec. 3, 2015.

(30) Foreign Application Priority Data

Dec. 4, 2014 (JP) .................................. 2014-246129

(51) Int. Cl.
C01B 32/20 (2017.01)
C09K 5/14 (2006.01)
(Continued)

(52) U.S. Cl.
CPC ................ C09K 5/14 (2013.01); C01B 32/20 (2017.08); G21G 4/02 (2013.01); H05H 3/06 (2013.01);
(Continued)

(58) Field of Classification Search
CPC ... G21G 4/02; H05H 3/06; H05H 6/00; C01B 32/005; C01B 32/20; C01B 32/21; C01B 32/215
(Continued)

(56) References Cited

U.S. PATENT DOCUMENTS 4,915,984 A * 4/1990 Murakami ............ C04B 35/524
264/101
4,983,244 A * 1/1991 Murakami ............ C04B 35/524
156/224
(Continued)

FOREIGN PATENT DOCUMENTS

CN 102730675 A 10/2012
EP 3285264 A1 2/2018
(Continued)

OTHER PUBLICATIONS

Yamagata, Y. et al., "The 27th World Conference of the International Nuclear Target Development Society State-of-the-Art Technologies for Nuclear Target and Charge Stripper," Journal of Radioanalytical and Nuclear Chemistry, vol. 305, 2015, National Museum of Emerging Science and Innovation (Miraikan) Tokyo, Japan, Aug. 31-Sep. 5, 2014 (6 pages).
(Continued)

Primary Examiner — Sharon M Davis
(74) Attorney, Agent, or Firm — Osha Liang LLP

(57) ABSTRACT

A thermal interface material under a high vacuum condition includes a graphite sheet having a thickness of from 9.6 μm to 50 nm and a thermal conductivity in an a-b surface direction at 25° C. of not less than 1000 W/mK.

18 Claims, 1 Drawing Sheet

(51) Int. Cl.
*H05H 6/00* (2006.01)
*G21G 4/02* (2006.01)
*H05H 3/06* (2006.01)
*G21K 5/00* (2006.01)

(52) U.S. Cl.
CPC ........... *H05H 6/00* (2013.01); *C01B 2204/04* (2013.01); *C01B 2204/24* (2013.01); *C01P 2006/10* (2013.01); *C01P 2006/32* (2013.01); *G21K 5/00* (2013.01)

(58) Field of Classification Search
USPC ...................................................... 423/448
See application file for complete search history.

(56) References Cited

U.S. PATENT DOCUMENTS

| | | | |
|---|---|---|---|
| 5,392,319 A * | 2/1995 | Eggers | H05H 3/06 376/151 |
| 6,215,851 B1 | 4/2001 | Meilunas et al. | |
| 2007/0032589 A1 | 2/2007 | Nishikawa et al. | |
| 2007/0278212 A1 | 12/2007 | Okimura | |
| 2007/0297554 A1* | 12/2007 | Lavie | G21G 1/10 376/190 |
| 2009/0301697 A1 | 12/2009 | Hirose | |
| 2010/0067640 A1* | 3/2010 | Willis | H05H 3/06 376/194 |
| 2010/0266830 A1 | 10/2010 | Nishikawa et al. | |
| 2011/0091000 A1* | 4/2011 | Stubbers | H05H 3/06 376/109 |
| 2011/0169180 A1 | 7/2011 | Inada et al. | |
| 2011/0265980 A1* | 11/2011 | Kubo | H01L 23/373 165/185 |
| 2012/0034151 A1 | 2/2012 | Nishikawa et al. | |
| 2013/0101498 A1 | 4/2013 | Nishikawa et al. | |
| 2013/0119571 A1* | 5/2013 | Ohta | C01B 32/20 264/29.1 |
| 2013/0164210 A1* | 6/2013 | Ohta | C08L 77/06 423/448 |
| 2013/0279638 A1 | 10/2013 | Matsumoto et al. | |
| 2014/0056801 A1 | 2/2014 | Nishikawa et al. | |
| 2015/0284253 A1* | 10/2015 | Zhamu | C09K 5/14 423/448 |
| 2016/0249453 A1 | 8/2016 | Tatami et al. | |
| 2018/0049306 A1 | 2/2018 | Murakami et al. | |

FOREIGN PATENT DOCUMENTS

| | | |
|---|---|---|
| JP | H01260709 A | 10/1989 |
| JP | H03203285 A | 9/1991 |
| JP | H05043213 A | 2/1993 |
| JP | H11224976 A | 8/1999 |
| JP | 2003279954 A | 10/2003 |
| JP | 2008028352 A | 2/2008 |
| JP | 2008272976 A | 11/2008 |
| JP | 4299261 B2 | 7/2009 |
| JP | 2010120818 A | 6/2010 |
| JP | 4512802 B2 | 7/2010 |
| JP | 2010203882 A | 9/2010 |
| JP | 2010234556 A | 10/2010 |
| JP | 4684354 B2 | 5/2011 |
| JP | 2012060010 A | 3/2012 |
| JP | 2012074682 A | 4/2012 |
| JP | 2013054889 A | 3/2013 |
| JP | 2013187415 A | 9/2013 |
| JP | 2013212938 A | 10/2013 |
| JP | 2014133669 A | 7/2014 |
| KR | 100828109 B1 | 5/2008 |
| WO | 2008025737 A1 | 3/2008 |
| WO | 2013154177 A1 | 10/2013 |
| WO | 2015045641 A1 | 4/2015 |

OTHER PUBLICATIONS

Hishiyama, Y. et al., "Crystal-grain size, phonon and carrier mean free paths in the basal plane, and carrier density of graphite films prepared from aromatic polyimide films," No. 254, p. 176-186, 2012 (11 pages).
Klemens, P.G. et al., "Thermal Conductivity of Graphite in the Basal Plane," Carbon, vol. 23, No. 4, p. 735-741, 1994 (7 pages).
Klemens, P.G., "Theory of the a-Plane Thermal Conductivity of Graphite," Journal of Wide Bandgap Materials, vol. 7, No. 4, p. 332-339, dated Apr. 2000 (8 pages).
International Search Report issued in International Application No. PCT/JP2015/084041 dated Jan. 19, 2016 (5 pages).
Association for Nuclear Technology in Medicine, "Karada Ni Yasashii Kyuukyoku No Gantiryou (Ultimate Cancer Therapy Gentle to the Body) Boron Neutron Capture Therapy," (with partial English Translation) dated May 2011 (21 pages).
Yamagata, Y., "RIKEN Accelerator-driven compact Neutron Source RANS," (with partial English translation) dated Jan. 18, 2013 (45 pages).
Extended European Search Report issued in European Application No. 15865480.6; dated Jun. 5, 2018 (8 pages).
Klemens, P.G. et al., "Thermal Conductivity of Graphite in the Basal Plane," Carbon, vol. 32, No. 4, p. 735-741, 1994 (7 pages).
B. T. Kelly et al., "The Basal Thermal Conductivity of Highly Oriented Pyrolytic Graphite as a Function of Degree of Graphitisation", Carbon, 1969, vol. 7, pp. 355-358 (4 pages).
J. R. Lloyd et al., "Electromigration in copper conductors", Elsevier, Thin Solid Films, 1995, vol. 262, pp. 135-141 (7 pages).
K. S. Novoselov et al., "Electric Field Effect in Atomically Thin Carbon Films", Science, Oct. 22, 2004, vol. 306, pp. 666-669 (5 pages).
B. Q. Wei et al., "Reliability and current carrying capacity of carbon nanotubes", Applied Physics Letters, Aug. 20, 2001, vol. 79, No. 8, pp. 1172-1174 (4 pages).
M. Murakami et al., "High-Quality and Highly Oriented Graphite Block From Polycondensation Polymer Films", Carbon, 1992, vol. 30, No. 2, pp. 255-262, Experimental, 3. Results and Discussion, Figures, Tables (8 pages).
T. Takeichi et al., "Carbonization and Graphitization of Polyimide Films: Polyamide Acid Methyl Ester of PMDA/PDA as a Precursor", Journal of Applied Polymer Science, John Wiley & Sons, Inc., US, vol. 61, Jun. 6, 1998, pp. 1571-1578 (8 pages).
Y. Nagata et al., "Change of Ordered Structure of Carbonizing of Aromatic Polyimide Films", SEN'I GAKKAISHI CODEN: SENGA5, 1997, vol. 53, No. 7, pp. 281-288, Partial English translation attached (8 pages).
International Search Report dated Nov. 4, 2014, in corresponding International Application No. PCT/JP2014/070932 (4 pages).
Written Opinion dated Nov. 4, 2014, in corresponding International Application No. PCT/JP2014/070932 (11 pages).

* cited by examiner

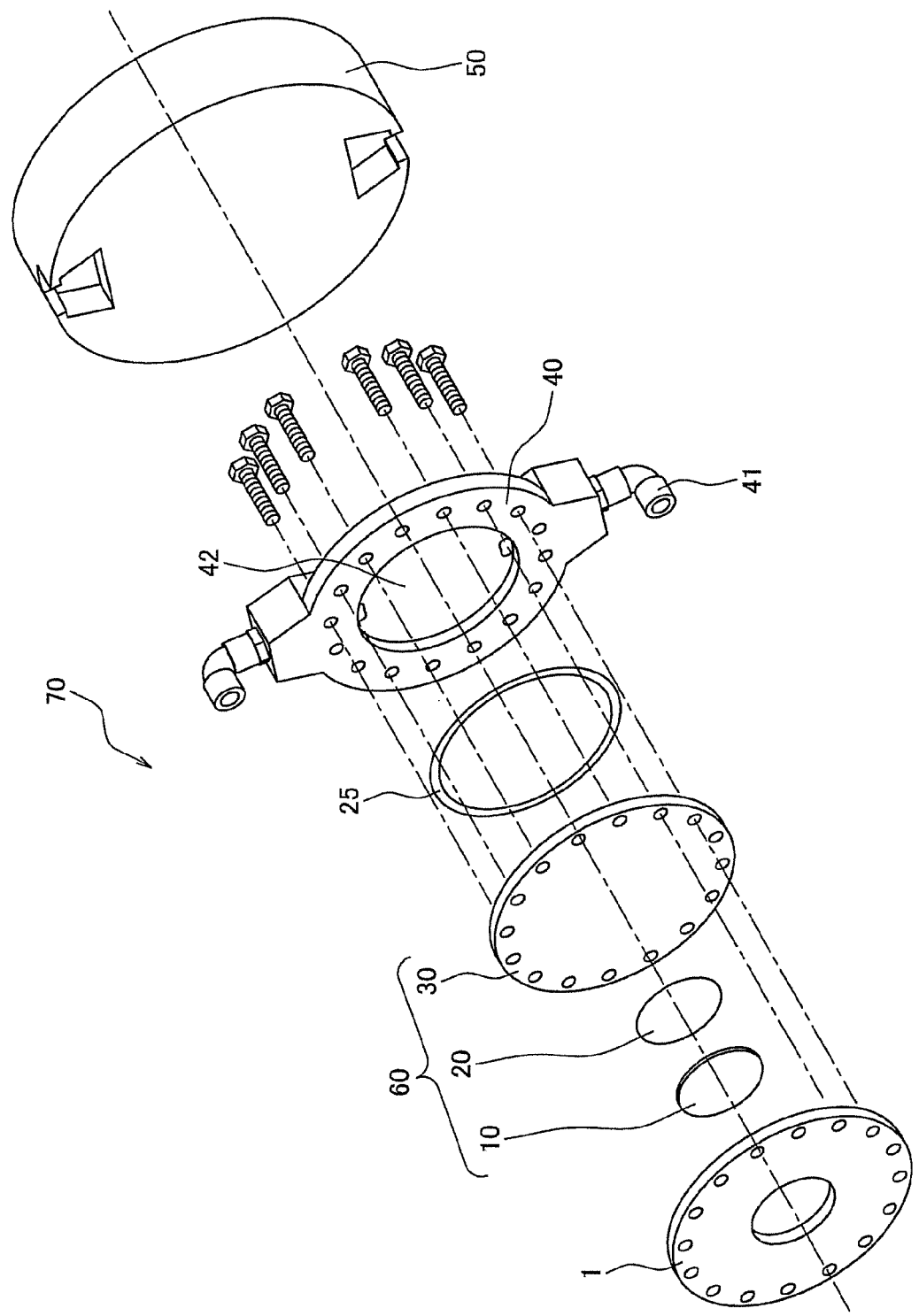

THERMAL INTERFACE MATERIALS MADE FROM GRAPHITE SHEETS UNDER HIGH VACUUM CONDITION

TECHNICAL FIELD

One or more embodiments of the present invention relate to thermal interface materials made from graphite sheets under high vacuum condition having no risk of outgassing under ultrahigh vacuum.

BACKGROUND

The boron neutron capture therapy (BNCT) in which neutrons are used has been attracting attention (Non-Patent Document 1), since it can remove a tumor at a deep part for which there is no cure by a routine surgical operation with regard to encephaloma, hepar, melanoma and the like. Examples of a method for generating neutrons used in this therapy include a method using a nuclear reactor and a method using an accelerator. As a simple and safe neutron-generating method, at present, a method using an accelerator has been attracting attention. In the apparatus, neutrons are generated by a method in which protons are gradually accelerated to be made into a proton beam and thereafter a neutron is made by a method in which the proton beam impinge on a metal-made or graphite-made lump called a target (Non-Patent Document 2). Moreover, such an accelerator-type neutron generator is expected to be utilized as an apparatus for nondestructively inspecting the soundness of steel frames in a bridge, and is expected to be utilized in the automobile industry, aircraft industry and space industry (Non-Patent Document 3).

In order to generate neutrons with such an accelerator, it is necessary to make the beam have a high intensity. When this high-intensity beam passes through a target, the target results in high temperature and the target is tend to deform by heat. A heat sink for cooling is assembled behind the target and a cooling water circulates in the heat sink for cooling to protect the target from heat generated by the beam. However, a limited portion of the target is periodically intensely heated by the beam, and it follows that the heating is repeated for a long time. As such, there is a fear that not only a target but also a heat sink for cooling are broken by a heat shock. As a metal usually used for the heat sink is radioactivated and obstructs beam, only specific ones can be used. For example, titanium (22 W/mK), vanadium (31 W/mK), palladium (72 W/mK), niobium (54 W/mK), tantalum (58 W/mK) and the like are usable, but these are low in thermal conductivity. As such the heat from a target does not conduct to the whole heat sink and the cooling efficiency is poor.

In reducing the thermal resistance, an thermal interface material (TIM: Thermal Interface Material) plays an important role. However, since the interior of an accelerator is kept in an ultra-high vacuum state ($10^{-6}$ to $10^{-7}$ Pa), in the case where heat release grease or a phase change sheet, which is generally used, is adopted, contamination of the interior of the apparatus is caused by outgassing. Moreover, when a TIM containing a metal and inorganic filler is adopted, there is a fear that filler scatters and contaminates the inside of a beam line.

PRIOR ART DOCUMENTS

Patent Documents

Patent document 1: JP-B-4299261
Patent document 2: JP-B-4684354

Non-Patent Documents

Non-Patent Document 1: Association for Nuclear Technology in Medicine "Karada Ni Yasashii Kyuukyoku No Gantiryou (Ultimate Cancer Therapy Gentle To The Body) Boron Neutron Capture Therapy", May, 2011
Non-patent Document 2: YAMAGATA, Y. et al, The 27th World Conference of the International Nuclear Target Development Society State-of-the-art Technologies for Nuclear Target and Charge Stripper Japan, Tokyo, September, 2014
Non-Patent Document 3: Yutaka Yamagata, "RIKEN Accelerator-driven compact Neutron Source RANS"
Non-patent Document 4: Y. Hishiyama, A. Yoshida, Y. Kaburagi, Carbon 254, 176(2012)
Non-patent Document 5: P. G. Klemens and D. F. Pedraza, Carbon 32 735(1994)
Non-patent Document 6: P. G. Klemens, J. W. Bandgap, Materials, 7(4), 332(2000)

SUMMARY

One or more embodiments of the present invention have been made in view of the above-mentioned circumstances, and one or more embodiments provide a material which is excellent in a characteristic of thermal conductivity as an thermal interface material and has no risk of outgassing or contaminating the interior of an apparatus even under high-vacuum and high-temperature conditions.

As a result of diligent researches, the present inventors have found that a graphite sheet eliminates the risk of outgassing even under ultrahigh vacuum and is a promising material as an thermal interface material (TIM). Moreover, the present inventors have found that, even in the case where a graphite sheet is used in an accelerator-type neutron generator, there is no fear of radioactivation or a beam obstruction, and moreover, the graphite sheet can withstand irradiation conditions in which a high-intensity beam is used at a high temperature for a long period of time and is promising especially in such applications.

Incidentally, as a kind of graphite sheet, natural graphite has been known (Patent Document 1), and the use of such a material as the TIM is also conceivable. However, the thermal conductivity in the surface direction of a natural graphite sheet is 200 to 500 W/mK or so, and the natural graphite sheet is characterized as being light in weight but weak in sheet strength because powdery or scale-like natural graphite is used as the raw material, and in the case of being broken, there has been a risk that graphite flakes are scattered inside a housing body.

A method of directly thermally treating a special polymer film to be graphitized has been developed (hereinafter, described as a polymer-annealing method). The graphite sheet preparation by this method is simple as compared with a preparation method of a conventional natural graphite sheet, and also, the resulting sheet is characterized as being excellent in mechanical properties, and furthermore, characterized in that extremely excellent thermal conductivity is attained (Patent Document 2). Since a graphite sheet prepared by the polymer-annealing method has a high thermal conductivity in the surface direction of 600 to 1600 W/mK, and furthermore, is resistant to bending, impacts or the like, at present, the sheet has been adopted in many mobile terminals.

However, as described above, a graphite sheet exhibiting higher thermal conductivity than that of conventional ones under an ultrahigh-vacuum condition has been desired, and especially, a thermal interface material made from graphite sheet under high vacuum condition capable of withstanding irradiation with a high-intensity proton beam under ultrahigh-vacuum and high-temperature conditions has been eagerly desired. On that account, as a result of further studies, by using an aromatic polymer (especially, an aromatic polyimide) as a polymer, making the thickness of the finally resultant graphite sheet lie within the range of 9.6 μm to 50 nm, making the density of the graphite sheet become not less than 1.8 g/cm$^3$ and performing the graphitization at an ultrahigh temperature of not less than 2900° C., a thermal interface material made from graphite sheet under high vacuum condition with a thermal conductivity of not less than 1000 W/mK is prepared. This sheet is a high thermal conducting material at the highest level as a film with a large area which can be easily practically handled, has no risk of outgassing even under ultrahigh vacuum and high temperature, and is greatly high in chemical stability and heat resistance. Accordingly, it is thought that the range of application thereof is extremely wide.

A thermal interface material made from graphite sheet under high vacuum condition is characterized in having a thickness of not more than 9.6 μm and not less than 50 nm and a thermal conductivity in the a-b surface direction at 25° C. of not less than 1000 W/mK. It is preferred that a density be not less than 1.8 g/cm$^3$.

The graphite sheet of one or more embodiments of the present invention is preferably obtained by thermally treating a polymer film at a temperature of not less than 2900° C. The polymer film is preferably at least one kind selected from among polyamides, polyimides, polyquinoxalines, polyoxadiazoles, polybenzimidazoles, polybenzoxazoles, polybenzthiazoles, polyquinazolinediones, polybenzoxazinones, polyquinazolones, benzimidazobenzophenanthroline ladder polymers and derivatives thereof.

The polymer film is preferably an aromatic polyimide. The aromatic polyimide is preferably a polyimide obtained by using either or both of pyromellitic acid anhydride and 3,3',4,4'-biphenyltetracarboxylic acid dianhydride as the raw material, or by using either or both of 4,4'-diaminodiphenyl ether and p-phenylenediamine as the raw material.

One or more embodiments of the present invention also include a graphite substrate material under high vacuum condition and a target substrate material under high vacuum condition, which are prepared from any one of the above-mentioned thermal interface material made from graphite sheet under high vacuum condition.

One or more embodiments of the present invention also include a layered type target material for generating neutrons, comprising a neutron-producing metal member and a proton-absorbing metal substrate which are layered, wherein any one of the above-mentioned thermal interface material made from graphite sheet under high vacuum condition is interposed between the neutron-producing metal member and the proton-absorbing metal substrate.

Further, one or more embodiments of the present invention include a target module for generating neutrons, comprising a neutron-producing metal member, a proton-absorbing metal substrate and a heat sink member which are layered in this order, wherein any one of the above-mentioned thermal interface material made from graphite sheet under high vacuum condition is interposed between the neutron-producing metal member and the proton-absorbing metal substrate, and any one of the above-mentioned thermal interface material made from graphite sheet under high vacuum condition is interposed between the proton-absorbing metal substrate and the heat sink member. In the target module, it is preferred that the neutron-producing metal member be a beryllium target, the proton-absorbing metal substrate be formed of at least one kind of material selected from among vanadium, niobium and tantalum, and the heat sink member be formed of at least one kind of material selected from among aluminum and titanium.

According to the graphite sheet according to one or more embodiments of the present invention, there is no fear of outgassing even under high vacuum and excellent heat release properties are attained because the sheet has an extremely high thermal conductivity in the a-b surface direction at 25° C. of not less than 1000 W/mK. Moreover, even in the case of being used in an accelerator-type neutron generator, there is no fear of radioactivation or a beam obstruction, and furthermore, the sheet can withstand irradiation conditions in which a high-intensity beam is used at a high temperature for a long period of time.

BRIEF DESCRIPTION OF THE DRAWING

FIG. 1 is a schematic exploded perspective view showing an example of the target module of the present invention.

DETAILED DESCRIPTION OF THE EMBODIMENTS

Hereinafter, the details of one or more embodiments of the present invention will be described, but the present invention should not be limited to the details given below.

<Graphite Sheet>

One or more embodiments of the present invention are characterized firstly in the point that used is a graphite sheet with a higher thermal conductivity (not less than 1000 W/mK, preferably not less than 1800 W/mK) compared with the natural graphite sheet with a thermal conductivity of 200 to 500 W/mK or so or the graphite sheet prepared by a conventional polymer annealing method with a thermal conductivity of 600 to 1600 W/mK or so. Such a graphite sheet with a high thermal conductivity is produced by a method in which a polymer film obtained from an aromatic polymer (especially, an aromatic polyimide) is heated to be carbonized and graphitized, and especially, can be produced by making the thickness of the finally resultant graphite sheet lie within the range of 9.6 μm to 50 nm, making the density of the graphite sheet become not less than 1.8 g/cm$^3$ and performing the graphitization at an ultrahigh temperature of not less than 2900° C.

<Polymer Raw Material>

First, a polymer film raw material used in the production of the graphite sheet according to one or more embodiments of the present invention will be described. The polymer raw material preferably used in the graphite preparation is an aromatic polymer, and the aromatic polymer is preferably at least one kind selected from among polyamides, polyimides, polyquinoxalines, polyoxadiazoles, polybenzimidazoles, polybenzoxazoles, polybenzthiazoles, polyquinazolinediones, polybenzoxazinones, polyquinazolones, benzimidazobenzophenanthroline ladder polymers and derivatives thereof. A film composed of these polymer raw materials may be produced by a known production method. Especially preferred examples of the polymer raw material can include an aromatic polyimide, polyparaphenylene vinylene, and polyparaphenylene oxadiazole. Of these, an aromatic polyimide prepared through a polyamic acid from an acid dianhydride (especially an aromatic acid dianhydride) and a diamine (especially an aromatic diamine) which are described below is especially preferred as the polymer raw material for the graphite preparation.

Examples of the acid dianhydride that can be used for the synthesis of the aromatic polyimide include pyromellitic acid anhydride, 2,3,6,7-naphthalenetetracarboxylic acid dianhydride, 3,3',4,4'-biphenyltetracarboxylic acid dianhydride, 1,2,5,6-naphthalenetetracarboxylic acid dianhydride, 2,2',3,3'-biphenyltetracarboxylic acid dianhydride, 3,3',4,4'-benzophenonetetracarboxylic acid dianhydride, 2,2-bis(3,4-dicarboxyphenyl)propane dianhydride, 3,4,9,10-perylenetetracarboxylic acid dianhydride, bis(3,4-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)ethane dianhydride, oxydiphthalic acid dianhydride, bis(3,4-dicarboxyphenyl)sulfone dianhydride, p-phenylenebis(trimellitic acid monoester acid anhydride), ethylenebis(trimellitic acid monoester acid anhydride), bisphenol A bis(trimellitic acid monoester acid anhydride), and analogues thereof, and those can be used alone or in combination of two or more kinds thereof as an arbitrary ratio mixture. In particular, from the viewpoints of a tendency for the orientation property of a polyimide film to be heightened as the film is made to have a more rigid polymer structure and the availability, pyromellitic acid anhydride and 3,3',4,4'-biphenyltetracarboxylic acid dianhydride are especially preferred.

Examples of the diamine that can be used for the synthesis of the aromatic polyimide include 4,4'-diaminodiphenyl ether, p-phenylenediamine, 4,4'-diaminodiphenyl propane, 4,4'-diaminodiphenyl methane, benzidine, 3,3'-dichlorobenzidine, 4,4'-diaminodiphenyl sulfide, 3,3'-diaminodiphenyl sulfone, 4,4'-diaminodiphenyl sulfone, 4,4'-diaminodiphenyl ether, 3,3'-diaminodiphenyl ether, 3,4'-diaminodiphenyl ether, 1,5-diaminonaphthalene, 4,4'-diaminodiphenyl diethylsilane, 4,4'-diaminodiphenyl silane, 4,4'-diaminodiphenyl ethylphosphine oxide, 4,4'-diaminodiphenyl N-methylamine, 4,4'-diaminodiphenyl N-phenylamine, 1,4-diaminobenzene(p-phenylenediamine), 1,3-diaminobenzene, 1,2-diaminobenzene, and analogues thereof, and those can be used alone or in combination of two or more kinds thereof as an arbitrary ratio mixture. Furthermore, from the viewpoints of heightening the orientation property of a polyimide film and the availability, it is especially preferred that 4,4'-diaminodiphenyl ether or p-phenylenediamine be used as the raw material to synthesize the aromatic polyimide.

For the preparation of a polyamic acid from an acid dianhydride and a diamine, any known method can be used, and usually, at least one kind of aromatic acid dianhydride and at least one kind of diamine are dissolved in an organic solvent, and the obtained organic solvent solution of a polyamic acid is stirred under a temperature-controlled condition until the polymerization of the acid dianhydride and the diamine is completed to produce the polyamic acid. The solution of the polyamic acid is usually obtained with a concentration of 5 to 35 wt %, preferably 10 to 30 wt %. In the case where the concentration lies within this range, suitable molecular weight and solution viscosity can be attained.

It is preferred that substantially equimolar amounts of an acid dianhydride and a diamine be dissolved in the raw material solution, and for example, the mole ratio is 1.5:1 to 1:1.5, preferably 1.2:1 to 1:1.2 and more preferably 1.1:1 to 1:1.1.

<Synthesis of Polyimide, Film Formation>

As a production method of a polyimide, a heat-curing method in which a polyamic acid as a precursor is imide-converted by heating and a chemically curing method in which a polyamic acid is imide-converted using a dehydrating agent typified by an acid anhydride such as acetic anhydride and a kind of tertiary amine as an imidation accelerator such as picoline, quinoline, isoquinoline and pyridine can be exemplified, and either thereof may be used. The chemically curing method is preferred, in the point that the coefficient of linear thermal expansion of the resulting film is likely to be small, the elastic modulus thereof is likely to be high, the birefringence thereof is likely to be large, the film is not broken even when tension is applied thereto during annealing, and moreover, graphite of good quality can be obtained. Moreover, the chemically curing method is also excellent in an aspect of the enhancement in thermal conductivity of a graphite film.

With regard to the high thermal conducting graphite sheet (with a thermal conductivity of not less than 1000 W/mK) used in one or more embodiments of the present invention, the thickness thereof lies within the range of 9.6 μm to 50 nm, and in order to obtain the graphite sheet with a thickness lying within such a range, it is preferred that the thickness of the raw material polymer film lie within the range of 18 μm to 120 nm. This is because there are many cases in which the thickness of the finally resultant graphite sheet generally becomes 60 to 30% or so of the thickness of a starting polymer film with a thickness of not less than 1 μm and becomes 50 to 20% or so of the thickness of a starting polymer film with a thickness of not more than 1 μm. Thus, finally, in order to obtain a graphite sheet with a thickness of 9.6 μm to 50 nm, it follows that the thickness of a starting polymer film preferably lies within the range of not more than 30 μm and not less than 100 nm. On the other hand, with regard to the length direction, there are many cases in which the dimension is reduced to 100 to 70% or so of the dimension of a starting polymer film.

The polymer film can be produced from the polymer raw material or the synthetic raw material thereof by any of the known various methods. For example, an organic solvent solution of a polyamic acid as the polyimide precursor is cast on a support such as an endless belt and a stainless steel drum and dried and imidized to produce the polyimide film. Specifically, the method for producing a film by a chemically curing method is as follows. First, to the polyamic acid solution, a stoichiometric amount or more of a dehydrating agent and a catalytic amount of an imidation accelerator are added, the solution is cast or applied on a support plate or a support such as an organic film including PET, a drum or an endless belt to be formed into a film shape, and the organic solvent is made to evaporate to obtain a film having a self-supportability. Then, this film is imidized while further being heated and dried to obtain a polyimide film. It is preferred that the temperature at the time of heating lie within the range of 150° C. to 550° C. Furthermore, it is preferred that a process of fixing or stretching the film to prevent the shrinkage be included in the production process of the polyimide. This is because the conversion to graphite proceeds more easily by using a film in which the molecular structure and the higher order structure thereof are controlled. That is, for making the graphitization reaction proceed smoothly, it is necessary for carbon molecules in the carbon precursor to be rearrayed, and it is presumed that the conversion to graphite easily proceeds even at a low temperature since the number of carbon molecules to be rearrayed can be minimized in a polyimide having an excellent orientation property.

<Carbonization and Graphitization>

Next, a method for carbonization and graphitization of a polymer film typified by a polyimide will be described. In one or more embodiments of the present invention, a polymer film as a starting material is preheated in an inert gas to be carbonized. As the inert gas, nitrogen, argon or a mixed gas of argon and nitrogen is preferably used. The preheating is usually performed at 100° C. or so. The temperature increasing rate to the preheating temperature is not particularly limited, and for example, the rate can to 5 to 15° C./minute. At a stage of the preliminary treatment, effective is applying a pressure in the surface direction to the degree, which doesn't cause breakage of a film, so as not to make the film lose the orientation property of the starting polymer film.

A film carbonized by the above-mentioned method is fitted to the inside of a high-temperature furnace to perform graphitization. It is preferred that a carbonized film be fitted in a state of being sandwiched between CIP materials or glassy carbon substrates. Graphitization is usually performed at a high temperature of not less than 2600° C., and in order to create such a high-temperature atmosphere, a current is usually allowed to flow directly through a graphite heater and the Joule heat is utilized to perform heating. Graphitization is performed in an inert gas, and as the inert gas, argon is the most suitable and the argon may be added with a small amount of helium. The higher the treatment temperature is, the better quality the graphite after being converted can have. There are many cases in which, by pyrolysis and carbonization, the area of the carbonized film is contracted by about 10 to 40% or so compared with its original polyimide film, and conversely, the area thereof is expanded by about 10% or so in the process of graphitization. Due to such contraction or expansion, an internal stress is generated in a graphite sheet to generate a strain inside the graphite sheet. Such a strain and an internal stress are relaxed by being treated at a temperature of not less than 2900° C., layers of graphite are arrayed with regularity, and furthermore, the thermal conductivity is heightened. In order to obtain the graphite according to one or more embodiments of the present invention, the temperature of 2600° C. is still insufficient, the treatment temperature is preferably not less than 2900° C., treatment at a temperature of not less than 3000° C. is more preferable, and treatment at not less than 3100° C. is most preferable. Of course, this treatment temperature may be the highest treatment temperature in the graphitization process, and the resultant graphite sheet may be subjected to a reheating treatment (may be thermally treated again) so as to be annealed. In this connection, for example, even when the treatment temperature is set to a temperature of not more than 3700° C. (especially not more than 3600° C., or not more than 3500° C.), an excellent graphite film is obtained. For example, the temperature increasing rate from the preheating temperature to the heat treatment temperature can be 15 to 25° C./minute. For example, the retention time at the treatment temperature is not less than 20 minutes and preferably not less than 30 minutes, and may be not less than 1 hour. Although the upper limit of the retention time is not particularly limited, the upper limit is usually not more than 5 hours, and especially, may be not more than 3 hours or so. In the case of being thermally treated at a temperature of not less than 3000° C. to be graphitized, it is preferred that the inner atmosphere of a high-temperature furnace be pressurized by the inert gas. When the heat treatment temperature is high, carbon begins to sublime from the sheet surface, and deterioration phenomena such as expansion of a hole or a crack on the graphite sheet surface and film thinning are caused, but such deterioration phenomena can be prevented by pressurizing and an excellent graphite sheet can be obtained. For example, the atmospheric pressure (gauge pressure) of a high-temperature furnace by an inert gas is not less than 0.10 MPa, preferably not less than 0.12 MPa and further preferably not less than 0.14 MPa. Although the upper limit of the atmospheric pressure is not particularly limited, for example, the upper limit is not more than 2 MPa, and especially, may be not more than 1.8 MPa or so. After the heat treatment, for example, the temperature needs only to be dropped at a rate of 30 to 50° C./minute.

<Features of Graphite Sheet>

From the viewpoint that the thinner the thickness of the graphite sheet used in one or more embodiments of the present invention is, the more the graphite sheet is excellent in high thermal conductivity, the thickness thereof is preferably not more than 9.6 μm. The reason is presumed to be as follows. That is, in the graphite sheet production by a polymer-annealing method, it is considered that, at the time of the graphitization reaction, the graphite structure is formed on the outermost surface layer of the polymeric carbonized sheet and grows toward the inside of the film. When the film thickness of the graphite sheet becomes thick, the graphite structure of the inside of the carbonized sheet is disturbed at the time of graphitization and a cavity or a deficit portion is easily formed. Conversely, when the sheet becomes thin, graphitization of the graphite layer structure in a well-ordered state proceeds from the sheet surface to the inside thereof, and as a result, a well-ordered graphite structure is easily formed in the whole sheet. It is considered that a graphite sheet exhibiting high thermal conductivity is formed because the graphite layer structure is well-ordered as described above.

On the other hand, in the preparation method of one or more embodiments of the present invention, when the thickness of a graphite sheet is not more than 50 nm, it is difficult to exhibit high thermal conductivity. The reason for this has not been necessarily elucidated yet, and when the thickness of a graphite sheet prepared by the method disclosed herein is not more than 50 nm, the sheet is made rich in flexibility but made poor in elasticity. Since it has been known that most of the thermal conduction of a graphite sheet is caused by a lattice vibration (phonon), it is presumed that this is because the reduction in elasticity of a film inhibits the expression of high thermal conductivity. It is difficult to prepare a graphite sheet which has a thickness of not more than 50 nm and is rich in elasticity. As described above, the thickness of the graphite sheet ranges from 9.6 μm to 50 nm, and is preferably 7.5 μm to 50 nm, more preferably 6.5 μm to 100 nm, further preferably 5.0 μm to 100 nm and most preferably 3.0 μm to 200 nm. A sheet thinned in thickness sticks to the substrate surface along the irregularity of the substrate, and once the sheet has stuck thereto, the sheet cannot be removed without using a tape or the like. When the thickness of a graphite sheet is more than 9.6 μm, the sheet is not preferred because there are cases where the graphite structure of the inside of the carbonized sheet is disturbed at the time of graphitization and a cavity or a deficit portion is easily formed. Moreover, when the thickness of a graphite sheet is less than 50 nm, the sheet is made rich in flexibility but made poor in elasticity, and is not preferred because there are cases where the expression of high thermal conductivity is inhibited.

It is preferred that the density of the graphite sheet not be less than 1.8 g/cm$^3$. In general, a high thermal conducting graphite sheet has a very dense structure in which a deficit portion or a cavity does not exist. When a deficit portion or a cavity exists in a graphite sheet, the density is decreased and there is also a tendency for thermal conductivity to be lowered. From this, it is preferred that the graphite be large in density, and the density is not less than 1.8 g/cm$^3$, more preferably not less than 2.0 g/cm$^3$ and most preferably not less than 2.1 g/cm$^3$. The upper limit of the density is not more than 2.26 g/cm$^3$, and may be not more than 2.20 g/cm$^3$.

As compared with highly oriented pyrolytic graphite (HOPG) prepared by further treating pyrolytic graphite (thermal decomposition graphite), which is obtained by supplying an organic gas such as methane onto a heated substrate and making the resultant grow out in a vapor phase therefrom, at a high temperature, a graphite sheet obtained by carbonizing and graphitizing such a polymer film used in one or more embodiments of the present invention also has a feature that no trace of the pyrolytic graphite exists. The pyrolytic graphite has a columnar structure, and even if this is subjected to a high-temperature treatment to prepare HOPG, this columnar grain boundary structure does not disappear completely.

The average crystal grain diameter (domain size) of the graphite used in one or more embodiments of the present invention may be not more than 10 μm, may be not more than 7 μm and may be not more than 5 μm. Although it is advantageous for the achievement of high thermal conductivity to make the crystal grain diameter large, the graphite sheet used exhibits excellent thermal conductivity even when the average crystal grain diameter is not more than 10 μm. It is presumed that this is because the graphite sheet used is a high-quality graphite having no columnar grain boundary structure as described above. In the first place, the reason why the thermal conductivity is affected by the crystal grain diameter is because phonons, which contribute to thermal conductivity, are scattered at the crystal grain boundary. However, in the high-quality graphite, scatter of phonons becomes less dependent on a crystal grain diameter of small size. It is interpreted that this is because only a kind of scatter called the umklapp process becomes dominant in the high-quality graphite (Non-Patent Document 4). In this connection, for example, the average crystal grain diameter of a graphite sheet used is not less than 2 μm, preferably not less than 3 μm and more preferably not less than 4 μm. Moreover, for example, the average crystal grain diameter (domain size) is not less than 0.1 times the thickness of the graphite sheet, preferably not less than 1 time the thickness thereof and further preferably not less than 2 times the thickness thereof.

Although the graphite sheet used in one or more embodiments of the present invention has a thermal conductivity in the a-b surface direction at a temperature of 25° C. of not less than 1000 W/mK, the thermal conductivity is preferably not less than 1800 W/mK, more preferably not less than 1960 W/mK, further preferably not less than 2000 W/mK, especially preferably not less than 2050 W/mK and most preferably not less than 2100 W/mK. There has been reported a theoretical limit value of the thermal conductivity in the graphite a-b surface direction of 1910 W/mK (Non-Patent Documents 5 and 6), and the thermal conductivity of not less than 1960 W/mK largely exceeds this limit value and is a result which had not been expected before. In this connection, for example, the thermal conductivity may be not more than 2400 W/mK and may be not more than 2300 W/mK.

<Graphite Substrate Material Under High Vacuum Condition>

The graphite sheet is recommended to be used for a thermal interface material (TIM) under high vacuum (not more than 10$^{-4}$ Pa, for example, 10$^{-6}$ to 10$^{-7}$ Pa or so or not more than 10$^{-7}$ Pa), and the graphite sheet itself can be used as a graphite substrate, and furthermore, can be used as a substrate prepared by being layered together with another base material. The graphite sheet does not contain impurities other than blacklead and is of high quality because the graphite sheet has already been subjected to graphitization at a temperature of not less than 2900° C. As such, even under high vacuum, and furthermore, even if being locally heated, outgassed components are not generated. In this connection, the graphite sheet is chemically stable, and as necessary, the graphite sheet may be used for applications other than the application under a high vacuum atmosphere. Examples of the atmosphere other than the high vacuum atmosphere include nitrogen, argon, neon, helium, hydrogen and the like.

<Target Substrate Material Under High Vacuum Condition>

Moreover, examples of the new application of the graphite sheet according to one or more embodiments of the present invention other than the TIM include a target substrate material under high vacuum condition which can be used under a high vacuum and highly reactive atmosphere by taking advantage of the property of being of high purity and being chemically stable. The target substrate material under high vacuum condition means a material prepared by bonding a target and a heat sink together using a graphite sheet by means of heat, pressurization, a laser or the like or a layered material prepared by mounting a target on a graphite sheet by a vapor deposition method, a sputtering method or an electrodeposition method, and the target can be irradiated with various kinds of beams to take out a reaction product between the target and the beam. The graphite sheet can be suitably used for such an application under a high vacuum and highly reactive atmosphere.

As the beam, protons, neutrons, ions (heavy atoms, light atoms) and the like can be used. The graphite sheet does not affect the reaction product between any of these beams and the target, and contributes to the heat dissipation from the target.

The source material for the target and the peripheral material thereof (heat sink material, casing material and the like) is not particularly limited, examples thereof include lithium, beryllium, boron, carbon, calcium, gold, silver, copper, aluminum, titanium, palladium, vanadium, tantalum, niobium, stainless steel, brass, molybdenum, and technetium, and moreover, examples thereof may include a doped product prepared with one kind thereof and a doped product prepared with combined two or more kinds thereof. Furthermore, an airtight container which is made of one kind of the element or combined two or more kinds thereof and allows the inside thereof to be filled with a gas such as hydrogen, helium, argon and nitrogen may be adopted.

<Target Module for Generating Neutrons>

The graphite sheet can also be used as a material for a target supporting substrate, an accelerator, an apparatus for generating neutrons, a sensor for a nuclear reactor, a beam sensor or the like, in addition to the graphite substrate material and target substrate material described above. Hereinbelow, as an example of such application technologies, an accelerator-type neutron generator will be given as an example to be explained.

FIG. 1 is a schematic perspective view showing an example of the target module for generating neutrons constituting the center of a neutron generator. The target module 70 for generating neutrons is provided with a substrate 1 for fixing a target, and a layered type target material 60 for generating neutrons composed of a neutron-producing metal member (target) 10 and a proton-absorbing metal substrate 30 which is layered at the back side of this neutron-producing metal member 10 and has an outer circumference being a size larger than that of the neutron-producing metal member 10. The substrate 1 and the layered type target material 60 are objects to be irradiated with a beam, and at the back side of this layered type target material 60, a heat sink member 40 for cooling the layered type target material 60 is connected. And then, to the rear side of this heat sink member 10, a moderator 50 for making protons decelerate is fixed. The neutron generator is provided with an accelerator (not illustrated) for generating accelerated protons and a neutron flight unit (not illustrated), in addition to such a target module 70 for generating neutrons, and protons from the accelerator are made to collide with the neutron-producing metal member 10 under high vacuum (not more than $10^{-4}$ Pa) to produce neutrons. And then, the protons produced are made to pass through the proton-absorbing metal substrate 30, the heat sink member 40 and the moderator 50, which exist at the back side of the neutron-producing metal member 10, and made to reach the neutron flight unit (not illustrated) to be used for various kinds of applications such as the boron neutron capture therapy and the nondestructive inspection.

In such a target module 70 for generating neutrons, the layered type target material 60 for generating neutrons becomes high in temperature by the reaction with high-energy protons. In order to cool the layered type target material 60, the heat sink member 40 is attached thereto, and the heat sink member as the illustrated example is a water-cooled one. Specifically, the heat sink member 40 as the illustrated example is provided with a chamber (jacket) 42 into which cooling water is introduced and two water flow pipes 41 for supplying/draining water to/from this jacket 42, and water in the jacket 42 can be brought into contact with the layered type target material 60 to cool the layered type target material 60.

However, in the target module 70, a limited portion of the neutron-producing metal member 10 is periodically intensely heated (subjected to ultraheating) by the proton beam, and it follows that the heating is repeated for a long period of time. As such, just by simply being cooled with water, there is a fear that both of the layered type target material 60 and the heat sink member 40 are broken by a heat shock. On that account, in the module according to one or more embodiments of the present invention, a graphite sheet is used as a thermal interface material (TIM). In the illustrated example, the graphite sheet-made thermal interface materials 20 and 25 are interposed between the neutron-producing metal member (target) 10 and the proton-absorbing metal substrate 30 and between the proton-absorbing metal substrate 30 and the heat sink member 40, respectively. At least one (preferably both) of such graphite-made thermal interface materials 20 and 25 can be incorporated into the target module 70 to heighten the heat-release properties of the layered type target material 60, and the breakage thereof can be prevented. Moreover, since such a graphite-made TIM is a highly heat-resistant material, the material itself is not broken under a high temperature condition.

In this connection, in the illustrated example, the graphite-made thermal interface material 20 between the neutron-producing metal member (target) 10 and the proton-absorbing metal substrate 30 has a circular shape equal to that of the neutron-producing metal member 10, and the graphite-made thermal interface material 25 between the proton-absorbing metal substrate 30 and the heat sink member 40 has a hollow disk-type (doughnut-type) shape, but the planar shape of the thermal interface material is not particularly limited as long as respective members between which the thermal interface material is interposed can be thermally bonded together and the thermal interface material may exist so as to overlap with the locus of a proton beam or a neutron beam. The graphite sheet is chemically stable, and even if the graphite sheet overlaps with the locus of a proton beam or a neutron beam, the graphite sheet does not adversely affect these beams, and moreover, the graphite sheet is not radioactivated.

In the target module 70, as the source material for the neutron-producing metal member 10, beryllium can be adopted. As the source material for the proton-absorbing metal substrate 30, one kind or two or more kinds of metal such as vanadium, niobium and tantalum can be adopted. As the source material for the heat sink member 40, one kind or two or more kinds of metal such as aluminum and titanium can be adopted.

The present application claims the profit of the right of priority to Japanese Patent application No. 2014-246129 filed on Dec. 4, 2014. The entire contents of the specification of the Japanese Patent application No. 2014-246129 filed on Dec. 4, 2014, are incorporated by reference herein.

EXAMPLES

Hereinafter, the embodiment according to one or more embodiments of the present invention will be described in more detail with reference to examples. Of course, the present invention should not be limited to these examples, not to mention that various embodiments are possible with regard to the small details.
(Evaluation Methods for Physical Properties)
<Film Thickness>
Each of the thicknesses of a polymer film as the raw material and a graphite sheet has an error of plus/minus 5 to 10% or so. As such, the ten-point average thickness of the film or sheet obtained was defined as the thickness of the sample in one or more embodiments of the present invention.
<Density>
With regard to the density of the graphite prepared, a graphite sheet was measured for the volume by means of a helium gas replacement type density meter [AccuPyc II 1340 SHIMADZU CORPORATION] and separately measured for the mass to calculate the density from the equation of Density $(g/cm^3)$=Mass $(g)$/Volume $(cm^3)$. In this connection, the density of a graphite sheet with a thickness of not more than 200 nm failed to be measured by this method because the magnitude of the error was too large. As such, in the case of calculating the thermal conductivity from the thermal diffusivity of a graphite sheet with a thickness of not more than 200 nm, the density thereof was assumed to be 2.1 to calculate the thermal conductivity thereof.

<Thermal Conductivity>

A graphite sheet was measured for the thermal diffusivity using a thermal diffusivity measuring apparatus (ADVANCE RIKO, Inc., the "LaserPit" apparatus) by a periodic heating method at a frequency of 10 Hz under vacuum ($10^{-2}$ Pa or so) at 25° C. This was a method of attaching a thermocouple to a point apart by a certain distance from an irradiation point irradiated with a laser beam to be heated and measuring a change in temperature at the point. By this method, the thermal conductivity (W/mK) was calculated by multiplying the thermal diffusivity ($m^2/s$) by the density ($kg/m^3$) by the specific heat (798 kJ/(kg·K)). In this context, in the case of using this apparatus, a graphite sheet with a thickness of not less than 1 μm can be measured for the thermal diffusivity, but the thermal diffusivity of a graphite sheet with a thickness of not more than 1 μm failed to be accurately measured because the magnitude of the measurement error became too large.

On that account, using a periodic heating radiant temperature measuring method (the Thermoanalyzer TA3 available from BETHEL Co., Ltd.) as the second measuring method, the measurement was performed. This was an apparatus in which periodic heating is performed by a laser and temperature measurement is performed by a radiation thermometer, and even a sample of a graphite sheet with a thickness of not more than 1 μm can be measured since the radiation thermometer and a graphite sheet are in a completely non-contact state at the time of measurement. In order to confirm the reliability of measured values of the two apparatuses, with regard to some samples, the sample was measured by the respective two apparatuses and it was confirmed that the two numerical values coincide with each other.

In the apparatus of BETHEL Co., Ltd., the frequency of periodic heating can be made to vary within a range of at most 800 Hz. That is, this apparatus is characterized in the point that temperature measurement, which is usually performed in a contact manner by a thermocouple, is performed by a radiation thermometer and the measurement frequency can be made to vary. In principle, a constant thermal diffusivity as a measured value should be attained even when the frequency is made to vary, and thus, in the measurement using this apparatus, the frequency was made to vary and the measurement of a thermal diffusivity was performed. In the case where a sample with a thickness of not more than 1 μm was measured, there were many cases in which the measured value fluctuates when measured at a frequency of 10 Hz or 20 Hz, but the measured value became almost constant when measured at each of frequencies ranging from 70 Hz to 800 Hz. On that account, a measured value (a numerical value measured at frequency ranging from 70 Hz to 800 Hz) obtained as a constant value irrespective of the frequency was defined as the thermal diffusivity.

Production Examples 1 to 18

A hardener comprising 20 g of acetic anhydride and 10 g of isoquinoline was mixed to 100 g of an 18 wt % DMF solution of a polyamic acid synthesized from pyromellitic acid anhydride and 4,4'-diaminodiphenyl ether in a proportion of 1/1 in terms of the mole ratio to be stirred, and after being centrifuged to be degassed, the liquid was cast and applied on a sheet of aluminum foil. The liquid was stirred and then centrifuged to be degassed while being cooled to 0° C. The layered product of the sheet of aluminum foil and the polyamic acid solution was heated at 120° C. for 150 seconds and at 300° C., 400° C. and 500° C. for 30 seconds respectively, and thereafter the sheet of aluminum foil was removed to prepare a polyimide film (Polymer sample A) with a different thickness. Moreover, as in the case of the sample A, pyromellitic acid anhydride and p-phenylenediamine were used as the raw material to prepare a polyimide film (Polymer sample B), and 3,3',4,4'-biphenyltetracarboxylic acid dianhydride and p-phenylenediamine were used as the raw material to prepare a polyimide film (Polymer sample C). With regard to the thickness of the polyimide film, by adjusting the casting speed and the like, several kinds of films differing in thickness within the range of 18 μm to 100 nm were prepared.

Eight kinds of polyimide films (Polymer sample A) with respective thicknesses ranging from 18 μm to 100 nm, three kinds of polyimide films (Polymer sample B) with respective thicknesses ranging from 9.2 to 1.1 μm and three kinds of polyimide films (Polymer sample C) with respective thicknesses ranging from 7.5 to 1.0 μm were placed in an electric furnace, and the internal temperature thereof was elevated to 1000° C. at a rate of 10° C./minute in a nitrogen gas atmosphere and the temperature was kept at 1000° C. for 1 hour to perform a preliminary treatment. Next, the carbonized sheet obtained was fitted to the inside of a cylindrical graphite heater, and the internal temperature thereof was elevated to a treatment temperature (maximum temperature) of 2900° C., 3000° C., 3100° C. or 3200° C. at a temperature increasing rate of 20° C./minute. The sheet was held in place for 30 minutes or 120 minutes (treatment time) at this temperature, and afterward, the internal temperature was dropped at a rate of 40° C./minute to prepare a graphite sheet. The treatment was performed under a positive pressure of 0.15 MPa in an argon atmosphere.

Values of the thickness (μm), density ($g/cm^3$) and thermal conductivity (W/mK) of the graphite sheet obtained were shown in Table 1. It has been found that, when the film has a thickness lying within the range shown in this table, all of the samples exhibit excellent thermal conductivity of not less than 1000 W/mK, preferably not less than 1800 W/mK, after being subjected to a heat treatment at 2900° C. or higher for 30 minutes or more.

TABLE 1

| Production Example | Polymer Sample | Maximum Temperature (° C.) | Treatment Time Minute ) | Thickness (μm) | Density ($g/cm^3$) | Thermal Conductivity (W/mK) |
|---|---|---|---|---|---|---|
| 1 | A | 3000 | 30 | 9.6 | 2.05 | 1960 |
| 2 | A | 3000 | 30 | 4.7 | 2.07 | 2010 |
| 3 | A | 3000 | 30 | 2.1 | 2.11 | 2080 |
| 4 | A | 3000 | 30 | 1.2 | 2.22 | 2100 |
| 5 | A | 3000 | 30 | 0.72 | 2.23 | 2080 |
| 6 | A | 3000 | 30 | 0.31 | 2.2 | 2120 |
| 7 | A | 3000 | 30 | 0.14 | — | 2120 |
| 8 | A | 3000 | 30 | 0.06 | — | 1990 |
| 9 | A | 2900 | 30 | 1.2 | 2.18 | 1800 |

TABLE 1-continued

| Production Example | Polymer Sample | Maximum Temperature (° C.) | Treatment Time Minute ) | Thickness (μm) | Density (g/cm³) | Thermal Conductivity (W/mK) |
|---|---|---|---|---|---|---|
| 10 | A | 2900 | 120 | 1.2 | 2.21 | 1880 |
| 11 | A | 3100 | 30 | 2.1 | 2.12 | 2150 |
| 12 | A | 3200 | 30 | 2.0 | 2.16 | 2230 |
| 13 | B | 3000 | 30 | 4.3 | 2.15 | 2020 |
| 11 | B | 3000 | 30 | 2.6 | 2.20 | 2100 |
| 15 | B | 3000 | 30 | 0.6 | 2.20 | 1980 |
| 16 | C | 3000 | 30 | 3.4 | 2.20 | 2040 |
| 17 | C | 3000 | 30 | 2.1 | 2.10 | 2000 |
| 18 | C | 3000 | 30 | 0.5 | 2.18 | 1980 |

Although only a few example embodiments have been described in detail above, those skilled in the art will readily appreciate that many modifications are possible in the example embodiments without materially departing from embodiments disclosed herein. Accordingly, all such modifications are intended to be included within the scope of this disclosure as defined in the following claims.

DESCRIPTION OF REFERENCE SIGNS

1: Substrate for fixing a target
10: Neutron-producing metal member
20, 25: Thermal interface material
30: Proton-absorbing metal substrate
40: Heat sink member
60: Layered type target material for generating neutrons
70: Target module for generating neutrons

The invention claimed is:

1. A thermal interface material for a high vacuum condition, comprising a graphite sheet having a thickness of from 9.6 μm to 50 nm and a thermal conductivity in an a-b surface direction at 25° C. of not less than 1800 W/mK.

2. The thermal interface material according to claim 1, wherein the graphite sheet is obtained by thermally treating a polymer film at a temperature of not less than 2900° C.

3. The thermal interface material according to claim 2, wherein the polymer film is an aromatic polyimide.

4. A graphite substrate material for high vacuum condition, being prepared from the thermal interface material according to claim 1.

5. A target substrate material for high vacuum condition, being prepared from the thermal interface material according to claim 1.

6. The thermal interface material according to claim 1, wherein the graphite sheet has the thermal conductivity in an a-b surface direction at 25° C. of not less than 1960 W/mK.

7. The thermal interface material according to claim 1, wherein the graphite sheet has the thermal conductivity in an a-b surface direction at 25° C. of not less than 2000 W/mK.

8. The thermal interface material according to claim 1, wherein the graphite sheet has the thickness of from 100 nm to 5.0 μm.

9. A layered target material for generating neutrons, comprising a neutron-producing metal member and a proton-absorbing metal substrate which are layered, wherein the thermal interface material according to claim 1 is interposed between the neutron-producing metal member and the proton-absorbing metal substrate.

10. A target module for generating neutrons, comprising:
a plurality of the thermal interface materials according to claim 1;
a neutron-producing metal member;
a proton-absorbing metal substrate; and
a heat sink member,
wherein the proton-absorbing metal substrate is interposed between the neutron-producing metal member and the heat sink member,
wherein one of the thermal interface materials is interposed between the neutron-producing metal member and the proton-absorbing metal substrate, and
wherein one of the thermal interface materials is interposed between the proton-absorbing metal substrate and the heat sink member.

11. The target module for generating neutrons according to claim 10, wherein the neutron-producing metal member is a beryllium target, the proton-absorbing metal substrate is formed of at least one kind of material selected from among vanadium, niobium and tantalum, and the heat sink member is formed of at least one kind of material selected from among aluminum and titanium.

12. A method for transferring heat, the method comprising:
inserting a graphite sheet between two components; and
transferring heat between the two components under a high vacuum condition, wherein
the graphite sheet has a thickness of from 9.6 μm to 50 nm and a thermal conductivity in an a-b surface direction at 25° C. of not less than 1800 W/mK.

13. The method according to claim 12, wherein the graphite sheet is obtained by thermally treating a polymer film at a temperature of not less than 2900° C.

14. The method according to claim 13, wherein the polymer film is an aromatic polyimide.

15. The method according to claim 12, wherein the two components are a neutron-producing metal member and a proton-absorbing metal substrate.

16. The method for transferring heat according to claim 12, wherein the graphite sheet has the thermal conductivity in an a-b surface direction at 25° C. of not less than 1960 W/mK.

17. The method for transferring heat according to claim 12, wherein the graphite sheet has the thermal conductivity in an a-b surface direction at 25° C. of not less than 2000 W/mK.

18. The method for transferring heat according to claim 12, wherein the graphite sheet has the thickness of from 100 nm to 5.0 μm.

* * * * *